Jan. 27, 1931.  S. O. TAYLOR  1,790,493
NUT LOCK
Filed April 19, 1929
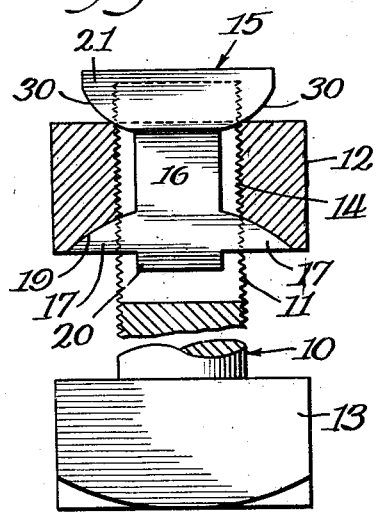
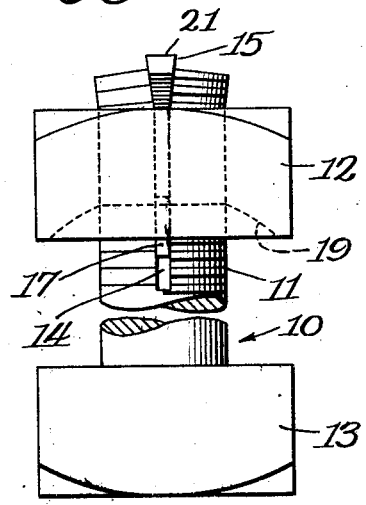
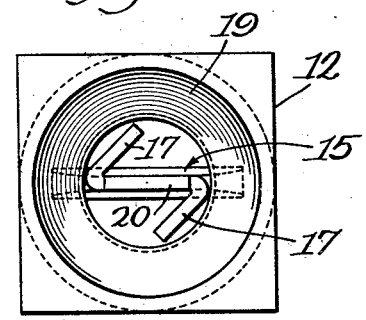
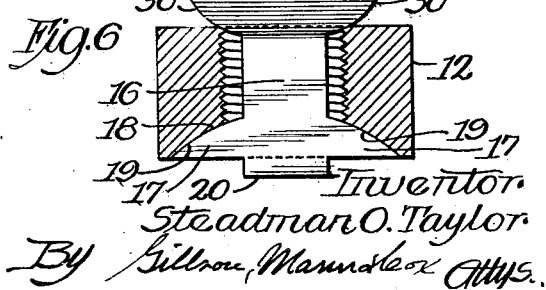

Patented Jan. 27, 1931

1,790,493

UNITED STATES PATENT OFFICE

STEADMAN O. TAYLOR, OF MAPLEWOOD, MISSOURI, ASSIGNOR TO T & S CORPORATION, A CORPORATION OF ILLINOIS

NUT LOCK

Application filed April 19, 1929. Serial No. 356,520.

This invention relates to means for preventing the accidental disengagement of nuts from bolts and the like.

The principal object of the invention is the provision of a new and improved device for securing a nut on a bolt so that it is practically impossible for the nut to become accidentally detached therefrom.

Another object of the invention is the provision of new and improved means for automatically distorting the ends of a bolt in the process of threading a nut thereon.

Another object of the invention is the provision of a new and improved device for distorting the end of a bolt upon applying a nut thereto that is assembled with the nut, is carried thereby, and is shipped to the user in assembled relation.

A further object of the invention is the provision of a new and improved spreader device for the ends of bolts and the like, that is cheap to manufacture, easily assembled on the nut, readily applied to the bolt, efficient in use, simple in construction, and that is positive and effective in its operation.

Other and further objects and advantages of the invention will appear from the following description taken in connection with the accompanying drawings, in which Fig. 1 is a side elevation of the device with parts in section;

Fig. 2 is a side elevation of the device shown in operative position with parts broken away;

Fig. 3 is a side elevation of the threaded portion of a bolt showing the recess or kerf therein;

Fig. 4 is a top plan view of a spreader member with the shoulder members folded in position to be extended through the nut;

Fig. 5 is a perspective view of the spreader member; and

Fig. 6 is a vertical section of the nut, showing the invention in position therein.

Referring now to the drawings, the reference character 10 designates a bolt of the usual or any well known construction. The bolt is screw-threaded at one end as shown at 11, which is adapted to be engaged by a nut 12 in the usual manner. The bolt may be provided with a head 13 as is usual in such constructions.

Suitable means are provided for distorting the end or portion of the threaded end of the bolt after the nut has been applied thereto for preventing the accidental or surreptitious removal of the nut.

In the form of construction selected to illustrate one embodiment of the invention, the outer or threaded end of the bolt is provided with a recess which is preferably in the form of a kerf or slot 14 extending longitudinally of the bolt, as clearly shown in Fig. 3 of the drawings. A spreading or distorting member 15 is employed for distorting the threaded end 11 of the bolt. The distorting member 15 comprises a body member 16 which is preferably thin and flat to engage in the opening 14 of the bolt 10 and is of less width than the diameter of said bolt so that it will readily pass through the opening in the nut. The inner end of the body portion 16 is provided with one or more wings or arms 17 extending laterally. The arms or wings 17 are provided with a curved surface 18 on their inner edge for forming shoulders for engaging a corresponding concave surface 19 on the inner end of the nut 12. The concave surface 19 permits the nut to be turned relative to the distorting or spreader member 15. The member 15 is extended at its inner end to form the projection 20 for engaging the slot in the bolt and for preventing the rotation of the spreader or distorting member 15 during the initial application of the nut 12. The outer end of the body portion 16 is provided with a cam or wedge member 21, for engaging in the opening 14 for distorting the end of the bolt after the nut has been applied thereto.

The lower edge of the wedge portion is preferably, though not necessarily, curved at each side of the body portion 16, as at 30, as clearly shown in Figs. 5 and 6 of the drawing, for facilitating the release of the wedge member when the nut is unscrewed from the bolt.

In attaching the distorting member 15 to the nut, the wings 17 are folded as shown in Fig. 4 and are inserted through the opening in the nut after which these wings are straightened out to confine the nut between the wedge member 21 and the wing members 17. In practice, the spreader member 15 is assembled on the nut at the factory.

In applying the device, the nut containing the spreader member 15 is placed on the threaded end of the bolt with the body portion 16 within the opening or slot 14 and with the projection 20 within the recess or slot 14, after which the nut is run on the bolt in the usual manner. The projection 20 extending inwardly beyond the inner surface of the nut will enable the same to be inverted in the opening 14 before the nut engages the bolt, thereby enabling the workman to readily position said projection in the slot or opening. The movement of the nut along the bolt will cause the wedge 15 to be drawn into the slot for distorting one or more portions of the outer end of the bolt, whereby the nut is locked in position on the bolt. In applying the nut to the bolt, the concave surface 19 of the nut engages the curved surface or shoulder 18 of the spreader member for drawing the wedge member 21 in the recess 14.

It is thought from the foregoing taken in connection with the accompanying drawings that the construction and operation of my device will be apparent to those skilled in the art, and that changes in size, shape, proportion and details of construction may be made without departing from the spirit and scope of the appended claims.

I claim as my invention:

1. In combination, a bolt having its outer end screw threaded and provided with a kerf extending longitudinally thereof, a one-piece nut, means within the opening in said nut for entering said kerf for distorting the end of said bolt when said nut is applied to said bolt, and means independent of said bolt for holding said nut and said first-named means in assembled relation.

2. In combination, a bolt having a threaded end, provided with an opening therein, a nut for engaging said threaded end, a wedge member engaging in said opening, means operated by said nut for forcing said wedge member into said opening for distorting a portion of said bolt for preventing the accidental removal of said nut, and means on said wedge member for engaging the outer surface of said nut for retracting said wedge when said nut is released from said bolt.

3. In combination, a nut having a threaded opening surrounded at one end thereof with a concave recess, a spreader member carried by said nut, said member comprising a thin body portion extending through said nut, a wedge shaped member secured to the outer end of said body portion and having portions overlying the outer face of said nut, and shoulders extending across the inner end of said opening, said shoulders being provided with convex surfaces for engaging said concave recess.

4. In a nut locking device, a spreader member comprising a thin, flat, body portion, a wedge shaped head on one end of said body portion, said head extending beyond the side edges of said body portion for engaging the outer surface of a nut, and shoulders on the opposite end of said body portion extending laterally therefrom and provided with curved surfaces on the inner edges for engaging a cooperating surface on the inner surface of a nut.

5. A spreader member for locking a nut on a bolt comprising a wedge portion, having convex surfaces on its inner edge for engaging the outer surface of a nut for retracting said member when said nut is released from a cooperating bolt, a shoulder portion for engaging the inner surface of a nut, and a body portion connecting said wedge and shoulder portions.

In testimony whereof I affix my signature.

STEADMAN O. TAYLOR.